United States Patent [19]
Vrijsen

[11] Patent Number: 5,803,801
[45] Date of Patent: Sep. 8, 1998

[54] METHOD FOR CONTINOUS STUFFING OF SHIRRED TUBULAR SAUSAGE CASINGS

[75] Inventor: Marc Joseph Martin Vrijsen, Zonhoven, Belgium

[73] Assignee: Devro-Teepak, Inc., Westchester, Ill.

[21] Appl. No.: 832,148

[22] Filed: Apr. 2, 1997

[51] Int. Cl.[6] .................................................. A22C 11/02
[52] U.S. Cl. ............................... 452/35; 452/30; 452/33; 452/45
[58] Field of Search ................................. 452/35, 30, 31, 452/33, 34, 45, 22

[56] References Cited

U.S. PATENT DOCUMENTS

| | | | |
|---|---|---|---|
| 4,493,179 | 1/1985 | Brak | 452/35 |
| 4,627,130 | 12/1986 | Nausedas | 452/33 |
| 4,734,956 | 4/1988 | Frey et al. | 452/35 |
| 4,991,260 | 2/1991 | Nausedas | 452/35 |
| 5,024,041 | 6/1991 | Urban et al. | 452/35 |
| 5,605,502 | 2/1997 | Christiensen | 452/30 |

FOREIGN PATENT DOCUMENTS 105446  4/1984  European Pat. Off. .................. 452/22

*Primary Examiner*—Willis Little
*Attorney, Agent, or Firm*—Michael L. Dunn

[57] ABSTRACT

A method and an apparatus which permit continuous stuffing of tubular food casing without stopping the stuffing operation to replace food casing on the stuffing horn. The method comprises placing a first shirred food casing strand onto a stuffing horn. An end portion of the food casing is then extended over the open end of the stuffing horn and the end portion is closed. The stuffing horn is suspended within the food casing by means of a first suspension means engaging the outer surface behind the shirred food casing and foodstuff is injected into the stuffing horn through a hole in the first suspension means which mates with a first inlet hole in the stuffing horn so that foodstuff flows through the stuffing horn into the food casing. A subsequent food casing strand is then placed onto the stuffing horn over the stuffing horn closed end and the stuffing horn is clamped by means of a second suspension means engaging the stuffing horn behind the subsequent food casing strand. Foodstuff is then injected into the stuffing horn through a hole in the second suspension means which mates with a second inlet hole in the stuffing horn so that foodstuff flows through the stuffing horn into the food casing. The first suspension means is then disengaged so that the stuffing horn is suspended by said second suspension means and the first hole in the first suspension means. The strands are connected together. The first suspension means is engaged when sufficient casing has been used so that the subsequent strand passes the first inlet hole and the subsequent strand replaces the first strand. Foodstuff is then again injected into the stuffing horn through the first suspension means, the second suspension means is disengaged and another subsequent food casing strand is placed onto the stuffing horn over the stuffing horn rear end. The above steps are repeated for so long as stuffing of food product continues. The apparatus comprises means for practicing the steps of the above method.

4 Claims, 2 Drawing Sheets

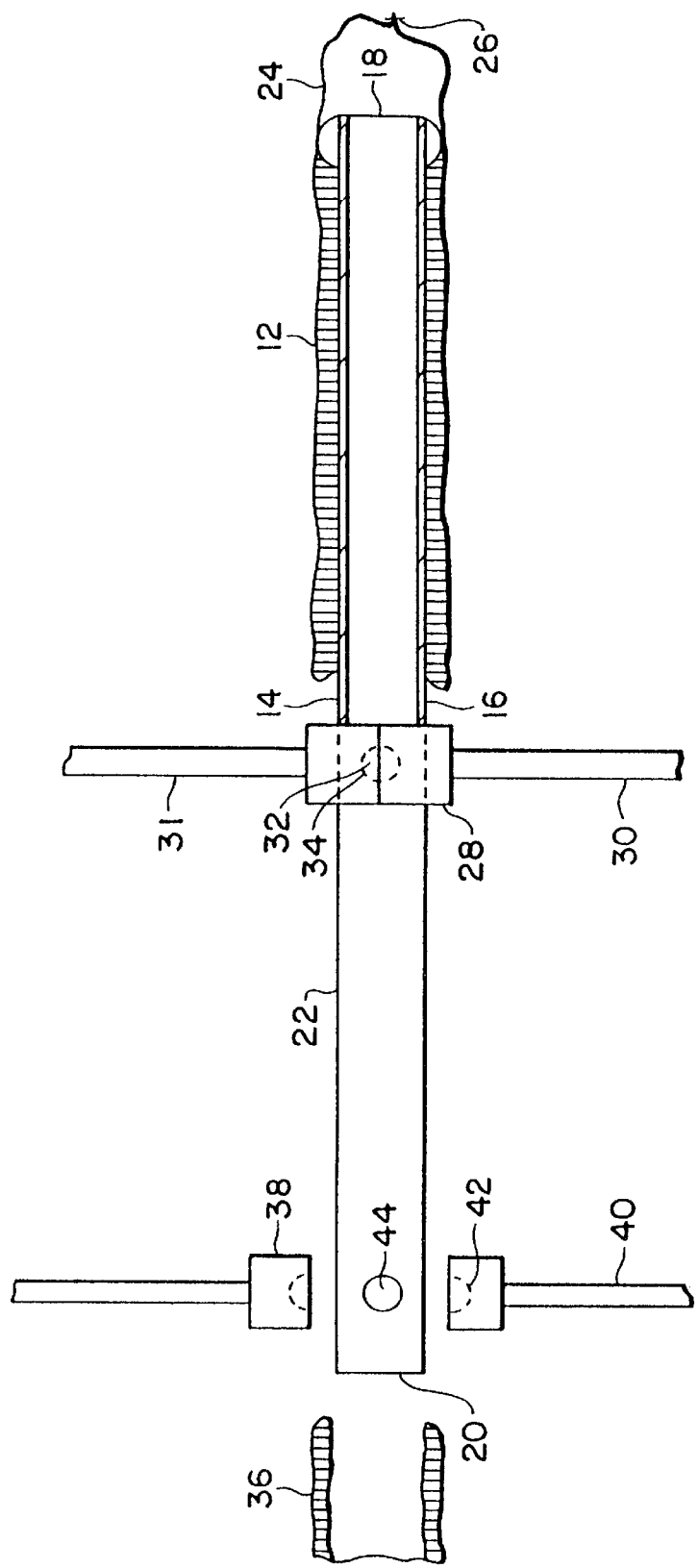

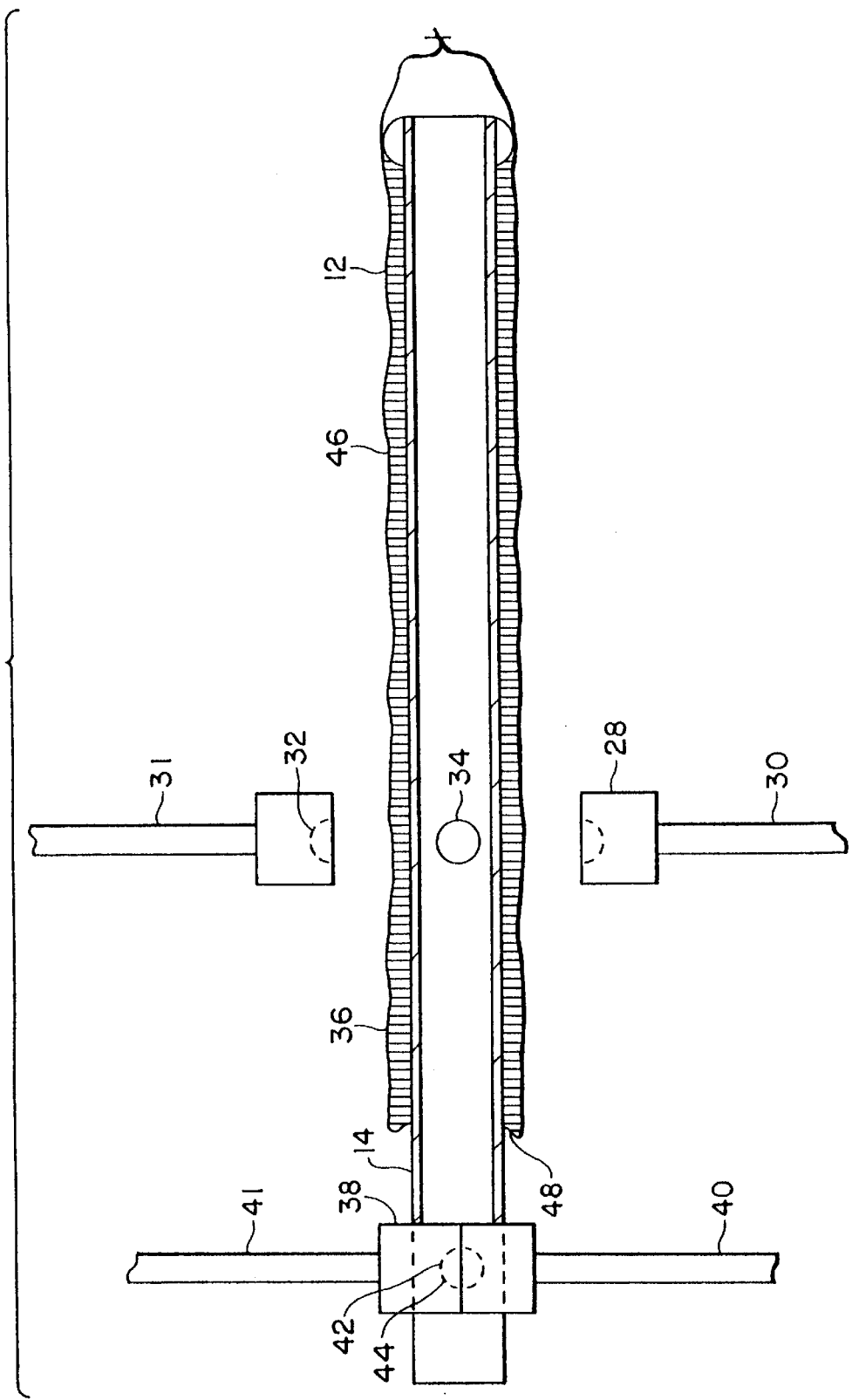

METHOD FOR CONTINOUS STUFFING OF SHIRRED TUBULAR SAUSAGE CASINGS

BACKGROUND OF THE INVENTION

This invention relates to food packaging and more particularly relates to stuffing of foods into tubular films, (food casings) e.g. tubular films made of regenerated cellulose, fiber mats impregnated with regenerated cellulose (fibrous food casings), collagen films, plastic films and natural gut.

Food products, stuffed into such tubular films, commonly include meats and cheeses. The meats are often sausage meats, e.g., hot dogs, summer sausage, pepperoni, bologna, fresh sausage, Italian sausage, Polish sausage, bratwurst and knockwurst. Other meats stuffed into such tubular films include ham, turkey, chicken and various lunch meats and cold cuts.

In order to stuff such food casings with food product, it has generally been necessary to place the food casing over the exterior surface of a stuffing horn which is a relatively rigid, hollow tube or pipe usually made of metal or plastic. An end of the food casing is closed and food then passes through the stuffing horn into the food casing, which is drawn from the exterior of the stuffing horn as the food casing is stuffed.

A problem with such a stuffing method is that it is discontinuous, i.e., the length of the stuffing interval is limited by the quantity of food casing placed over the stuffing horn.

To alleviate the problem, methods have been devised for increasing the lengths of food casing held by the stuffing horn. Initially, a length of food casing was manually longitudinally compressed over the stuffing horn until the exterior surface of the stuffing horn was covered. Later, lengths of casing were longitudinally prefolded in the manner of a concertina (shirred) and then compressed. Such prefolded (shirred) casing became known as sticks and could contain a length of casing (deshirred) of as much as fifty times the length of the shirred stick. Such shirred sticks reduced the number of times that the stuffing horn had to be reloaded per 100 feet (30 meters) of casing but stuffing still had to be stopped and the stuffing horn reloaded when the quantity of food casing in the shirred stick was depleted.

Up to now, there has been no good method or apparatus for continuous stuffing of tubular food casing.

BRIEF DESCRIPTION OF THE DRAWINGS

FIG. 1 shows a partial cross-section of the apparatus of the invention showing stuffing of a loaded first shirred stick and the loading of a second shirred stick.

FIG. 2 shows a partial cross-section of the apparatus of the invention showing the continued stuffing of the first shirred stick as the second shirred stick is moved toward and attached to the trailing end of the first shirred stick.

BRIEF DESCRIPTION OF THE INVENTION

In accordance with the invention, a method and an apparatus are provided which permits continuous stuffing of tubular food casing without stopping the stuffing operation to replace food casing on the stuffing horn.

In particular, the method comprises placing a first shirred food casing strand onto a stuffing horn comprising a hollow tube having a front open end, a rear end and an intermediate outer surface. An end portion of the food casing is then extended over the open end of the stuffing horn and the end portion is closed. The stuffing horn is suspended within the food casing by means of a first suspension means engaging the outer surface behind the shirred food casing and foodstuff is injected into the stuffing horn through a hole in the first suspension means which mates with a first inlet hole in the stuffing horn outer surface so that foodstuff flows through the stuffing horn through the open end into the food casing. A subsequent food casing strand is then placed onto the stuffing horn over the stuffing horn closed end and the stuffing horn is clamped by means of a second suspension means engaging the stuffing horn behind the subsequent food casing strand. Foodstuff is then injected into the stuffing horn through a hole in the second suspension means which mates with a second inlet hole in the stuffing horn so that foodstuff flows through the stuffing horn through the open end into the food casing. The first suspension means is then disengaged so that the stuffing horn is suspended by said second suspension means and the first hole in the first suspension means and first inlet stuffing horn hole are simultaneously closed. A front of the subsequent strand is then moved in contact with a rear of the first strand and the strands are connected together. The first suspension means is engaged when sufficient casing has been used so that the subsequent strand passes the first inlet hole and the subsequent strand replaces the first strand. Foodstuff is then again injected into the stuffing horn through the first suspension means, the second suspension means is disengaged and another subsequent food casing strand is placed onto the stuffing horn over the stuffing horn rear end. The above steps are repeated for so long as stuffing of food product continues.

The apparatus comprises means for practicing the steps of the above method.

DETAILED DESCRIPTION OF THE INVENTION

In accordance with the invention, the first food casing strand may be placed onto the stuffing horn by any suitable means, manually or automatically. Apparatus for placing a shirred food casing strand onto a stuffing horn is well known in the art, see e.g., U.S. Pat. Nos. 3,115,668; 3,321,072; RE 32,315; 4,538,326; 4,642,848; 4,649,601; and 4,660,254.

In those patents, incorporated herein by reference, the strand is placed onto the stuffing horn from the open front end; however, in the present invention, the initial strand is placed upon the stuffing horn from either the rear end or the front end. Subsequent strands are placed upon the stuffing horn from the rear end in accordance with the present invention. The function of placing the strands upon the stuffing horn is essentially the same in both cases; however, unlike the present invention, in the prior art, the rear end was not available to accept a food casing strand.

Extending an end portion of the food casing (the leading end) over the open end of the stuffing horn and closing the leading end is done by methods well known in the art. The end, in general, is closed by tying or clipping.

The stuffing horn is initially suspended within the food casing by any suitable means, but is usually clamp means engaging the outer surface of the stuffing horn behind the shirred strand which is being stuffed.

After a subsequent food casing is placed upon the stuffing horn over the stuffing horn rear end, a second suspension means is activated to engage the stuffing horn behind the subsequent strand. Such second suspension means may be a clamp engaging the exterior surface of the stuffing horn or an attachment to the rear end, e.g., by a quick coupling or screw mechanism.

When foodstuff is injected into the stuffing horn through the second suspension means, as previously described, access of foodstuff to the stuffing horn through the first suspension means is stopped and the first suspension means is disengaged which permits the subsequent strand to contact and be secured to the first strand.

After sufficient casing is used to allow access to the first inlet hole, the first suspension means is again engaged and the second suspension means is disengaged to allow another strand to be placed over the rear end of the stuffing horn.

The process is repeated in an uninterrupted, continuous operation so long as stuffing is desired.

The suspension means are activated by any suitable drive means such as air cylinders or stepping motors.

To more fully explain the invention, reference may be had to the drawings which illustrate one preferred embodiment.

As seen in FIG. 1, a first shirred food casing strand 12 is placed onto a stuffing horn 14 comprising a hollow tube 16 having a front open end 18, a rear end 20 and an intermediate outer surface 22. An end portion 24 of food casing 12 is extended over open end 18 and closed by means of a clip 26. Stuffing horn 14 is suspended within food casing 12 by means of a first clamp 28 which engages outer surface 22. Foodstuff is injected through supporting pipe 30 to clamp 28, through first clamp hole 32 and first stuffing horn inlet hole 34 so that foodstuff flows through stuffing horn 14 into food casing 12. Such foodstuff is supplied to pipe 30 by a pump not shown.

With the above arrangements, a subsequent food casing strand 36 is placed over end 20 of stuffing horn 14 until the strand is located entirely between first clamp 28 and second clamp 38. Clamp 38 is then closed to retain stuffing horn 14 and foodstuff is introduced into stuffing horn 14 and casing 12 by means of supporting pipe 40, second clamp hole 42 and second horn inlet hole 44.

Food flow through clamp 28 is then stopped and clamp 28 is opened by means of supporting pipe 30 and retaining pipe 31. Casing 36 is then connected to casing 12 at junction 46.

As stuffing continues, strand 12 is depleted and strand 36 takes its place. When the trailing end of strand 36 passes clamp 28, clamp 28 is closed and foodstuff is again supplied to the stuffing horn 14 through tube 30, clamp 28, hole 32 and hole 34. Food flow through clamp 38 is then terminated and clamp 38 is opened by means of pipe 40 and retaining pipe 41 which permits yet another subsequent strand to be placed over end 20 of stuffing horn 14 for repetition of the process.

The clamps may be opened and closed by any suitable means but are usually opened by air actuated cylinders attached to pipes 30, 31, 40 and 41.

The flow of foodstuff through the clamps is usually controlled by means of valves attached prior to inlets on pipes 30 and 40.

Foodstuff is prevented from exiting holes 34 and 44 when clamps 28 and 38 are open, by means of check valves seated at those holes.

Casing 46 is connected to casing 12 by any suitable means but an adhesive, such as cyanoacrylate adhesive, is usually employed.

What is claimed is:

1. A method for continuous stuffing of food product into a tubular food casing which comprises:

a) placing a first shirred food casing strand onto a stuffing horn comprising a hollow tube having a front open end, a rear end and an intermediate outer surface;

b) extending an end position of the food casing over the open end of the stuffing horn and closing said end position;

c) suspending said stuffing horn within the food casing by means of a first suspension means engaging the outer surface behind the shirred food casing;

d) injecting foodstuff into the stuffing horn through a hole in the first suspension means which mates with a first inlet hole in the stuffing horn outer surface so that foodstuff flows through the stuffing horn through the open end into the food casing;

e) placing a subsequent food casing strand onto the stuffing horn over the stuffing horn rear end;

f) suspending said stuffing horn by means of a second suspension means engaging the stuffing horn behind the subsequent food casing strand;

g) injecting foodstuff into the stuffing horn through a hole in the second suspension means which mates with a second inlet hole in the stuffing horn so that foodstuff flows through the stuffing horn through the open end into the food casing;

h) disengaging said first suspension means so that said stuffing horn is suspended by said second suspension means and simultaneously closing the first hole in the first suspension means and first inlet stuffing horn hole;

i) moving a front of the subsequent strand in contact with a rear of the first strand and connecting the strands together;

j) engaging said first suspension means when sufficient casing has been used so that the subsequent strand passes said first inlet hole and the subsequent strand replaces the first strand;

k) injecting foodstuff into the stuffing horn through the first suspension means;

l) disengaging said second suspension means;

m) placing another subsequent food casing strand onto the stuffing horn over the stuffing horn rear end; and n) repeating steps c through m above for so long as stuffing of food product continues.

2. The method of claim 1, wherein the first and second suspension means comprises clamps.

3. An apparatus for continuous stuffing of food product into a tubular food casing which comprises:

a) a stuffing horn having front and rear ends and first and second stuffing horn inlet holes;

b) means for placing a first shirred food casing strand onto the stuffing horn comprising a hollow tube having a front open end, a rear end and an intermediate outer surface;

c) means for extending an end portion of the food casing over the open end of the stuffing horn;

d) means for closing said end portion;

e) a first suspension means engaging the outer surface behind the shirred food casing for suspending said stuffing horn within the food casing, said suspension means having a first suspension means inlet hole which mates with the stuffing horn first inlet hole;

f) means for injecting foodstuff into the stuffing horn through the hole in the first suspension means through the first inlet hole in the stuffing horn outer surface so that foodstuff flows through the stuffing horn through the open end into the food casing;

g) means for placing a subsequent food casing strand onto the stuffing horn over the stuffing horn rear end;

h) second suspension means engaging the stuffing horn behind the subsequent food casing strand for suspending the stuffing horn within the food casing; said suspension means having a second suspension means inlet hole which mates with the stuffing horn second inlet hole;

i) means for injecting foodstuff into the stuffing horn through the hole in the second suspension means through the second inlet hole in the stuffing horn so that foodstuff flows through the stuffing horn through the open end into the food casing;

j) means for disengaging said first suspension means so that said stuffing horn is suspended by said second suspension means and means for simultaneously closing the first hole in the first suspension means and first inlet stuffing horn hole;

k) means for moving a front of the subsequent strand in contact with a rear of the first strand and connecting the strands together;

l) means for engaging said first suspension means when sufficient casing has been used so that the subsequent strand passes said first inlet hole and the subsequent strand replaces the first strand;

m) means for injecting foodstuff into the stuffing horn through the first suspension means;

n) means for disengaging said second suspension means;

o) means for placing another subsequent food casing strand onto the stuffing horn over the stuffing horn rear end; and p) means for repeating steps e through o above for so long as stuffing of food product continues.

4. The apparatus of claim 3, wherein the first and second suspension means comprises clamps.

* * * * *